United States Patent
Wideman et al.

(10) Patent No.: US 9,912,754 B2
(45) Date of Patent: Mar. 6, 2018

(54) VEHICULAR DATA ISOLATION DEVICE

(71) Applicant: GM Global Technology Operations LLC, Detroit, MI (US)

(72) Inventors: Corey Wideman, Shelby Township, MI (US); Kevin M. Baltes, Wixom, MI (US); Joseph E. Ploucha, Commerce Township, MI (US); Thomas M. Forest, Macomb, MI (US); Michael L. Imel, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 106 days.

(21) Appl. No.: 14/702,452

(22) Filed: May 1, 2015

(65) Prior Publication Data
US 2016/0323386 A1    Nov. 3, 2016

(51) Int. Cl.
*H04L 29/08*     (2006.01)
*H04L 29/06*     (2006.01)

(52) U.S. Cl.
CPC ............ *H04L 67/12* (2013.01); *H04L 63/101* (2013.01); *H04L 67/125* (2013.01); *H04L 69/08* (2013.01)

(58) Field of Classification Search
CPC ................................. H04L 67/12; H04L 63/04
USPC .................................................. 709/225, 249
See application file for complete search history.

(56) References Cited

U.S. PATENT DOCUMENTS

| 4,361,870 | A  | * | 11/1982 | D'Agostini ........ G01R 31/007 701/29.6 |
| 6,519,710 | B1 | * | 2/2003  | Saunders ............ G06F 11/1679 709/213 |
| 6,853,292 | B1 | * | 2/2005  | Kramer ................... G05B 9/03 324/500 |
| 7,484,008 | B1 | * | 1/2009  | Gelvin .................... H04L 67/12 701/408 |
| 7,813,486 | B2 | * | 10/2010 | Vertaschitsch ...... G06F 3/04886 379/90.01 |
| 7,891,004 | B1 | * | 2/2011  | Gelvin .................... H04L 67/12 701/24 |
| 8,604,919 | B2 | * | 12/2013 | Otterson ................ G08G 1/205 340/438 |
| 9,348,577 | B2 | * | 5/2016  | Hoffman .................. G06F 8/65 |

(Continued)

OTHER PUBLICATIONS

Chung SM, Jin HW. Isolating system faults on vehicular network gateways using virtualization. InEmbedded and Ubiquitous Computing (EUC), 2010 IEEE/IFIP 8th International Conference on Dec. 11, 2010 (pp. 791-796). IEEE.*

(Continued)

*Primary Examiner* — Ranodhi Serrao
*Assistant Examiner* — James Fiorillo
(74) *Attorney, Agent, or Firm* — David Willoughby; Reising Ethington P.C.

(57) ABSTRACT

A system and method of regulating data communications between a vehicle electronics system and a computing device includes: communicatively linking a first data port of an isolation device with the vehicle electronics system; communicatively linking a second data port of the isolation device with the computing device; receiving data at the isolation device sent between the computing device and the vehicle electronics system; and permitting the data to pass through the isolation device based on the identity of the computing device, the rate at which the data passes through the isolation device, or the content of the data.

19 Claims, 3 Drawing Sheets

(56) References Cited

U.S. PATENT DOCUMENTS

| | | | | |
|---|---|---|---|---|
| 2003/0081935 | A1* | 5/2003 | Kirmuss | H04N 7/18 386/327 |
| 2003/0131177 | A1* | 7/2003 | Ng | G06F 13/4022 710/313 |
| 2005/0268006 | A1* | 12/2005 | Julicher | G06F 13/4072 710/62 |
| 2007/0005880 | A1* | 1/2007 | Burroughs | G06F 3/0626 711/112 |
| 2007/0165347 | A1* | 7/2007 | Wendt | H02J 3/38 361/92 |
| 2007/0237158 | A1* | 10/2007 | Leef | H04L 12/4641 370/395.53 |
| 2010/0114248 | A1* | 5/2010 | Donofrio | A61N 1/025 607/60 |
| 2011/0307196 | A1* | 12/2011 | Schumacher | G01R 31/025 702/58 |
| 2013/0205026 | A1* | 8/2013 | Ricci | H04L 47/70 709/225 |
| 2013/0219039 | A1* | 8/2013 | Ricci | H04L 43/0876 709/223 |
| 2013/0227648 | A1* | 8/2013 | Ricci | G06F 3/0484 726/3 |
| 2014/0032800 | A1* | 1/2014 | Peirce | H04L 67/12 710/105 |
| 2014/0250530 | A1* | 9/2014 | Moeller | H04L 63/1408 726/23 |
| 2015/0020152 | A1* | 1/2015 | Litichever | H04L 63/14 726/1 |
| 2015/0025917 | A1* | 1/2015 | Stempora | G06Q 40/08 705/4 |
| 2015/0135271 | A1* | 5/2015 | Forest | H04L 9/3226 726/4 |
| 2015/0225089 | A1* | 8/2015 | Judge | B64D 43/00 701/3 |
| 2015/0379114 | A1* | 12/2015 | Onishi | G08G 1/096716 707/737 |
| 2016/0082903 | A1* | 3/2016 | Haggerty | B60R 16/023 701/23 |
| 2016/0261990 | A1* | 9/2016 | Zimmermann | H04W 4/028 |
| 2017/0284822 | A1* | 10/2017 | Foster | G01C 21/3629 |

OTHER PUBLICATIONS

Duri S, Gruteser M, Liu X, Moskowitz P, Perez R, Singh M, Tang JM. Framework for security and privacy in automotive telematics. InProceedings of the 2nd international workshop on Mobile commerce Sep. 28, 2002 (pp. 25-32). ACM.*

* cited by examiner

VEHICULAR DATA ISOLATION DEVICE

TECHNICAL FIELD

The present invention relates to vehicle electronics systems and, more particularly, to an isolation device that regulates data communications between the vehicle electronics system and a computing device.

BACKGROUND

Modern vehicles include an array of vehicle electronics that facilitate vehicle functions. For example, the vehicles can include electronic control units (ECUs), vehicle sensors, vehicle telematics units, infotainment head units, and memory devices, to name a few examples. These elements generally exchange data over a vehicle bus as part of collectively executing different vehicle functions. In addition, the vehicle electronics may include an outward-facing data port that permits connection with an external computing device. On one hand, the data port can helpfully grant a service technician the ability to upload software updates to the vehicle electronics or download information, such as diagnostic trouble codes (DTCs), that can be used to improve vehicle operation. On the other hand, the data port may also permit unauthorized users to access the vehicle electronics as well.

Vehicle electronics may include a number of defensive mechanisms to deter unauthorized access to vehicle busses. But improvements to those defensive mechanisms may be developed after the design of vehicle electronics has been determined and/or a significant number of vehicle electronics components have already been assembled. In that event, it can sometimes be difficult if not impossible to retrofit the vehicle electronics components with updated defensive mechanisms. Thus, it would be helpful to implement a dynamic device that can regulate data communications between the vehicle electronics and an external computing device and be physically located in the data port path between them.

SUMMARY

According to an embodiment of the invention, there is provided a method of regulating data communications between a vehicle electronics system and a computing device. The method includes communicatively linking a first data port of an isolation device with the vehicle electronics system; communicatively linking a second data port of the isolation device with the computing device; receiving data at the isolation device sent between the computing device and the vehicle electronics system; and permitting the data to pass through the isolation device based on the identity of the computing device, the rate at which the data passes through the isolation device, or the content of the data.

According to another embodiment of the invention, there is provided a method of regulating data communications between a vehicle electronics system and a computing device. The method includes communicatively linking a first data port of an isolation device with the vehicle electronics system; communicatively linking a second data port of the isolation device with the computing device; receiving data at the isolation device sent between the computing device and the vehicle electronics system; recording at least some portion of the received data at the isolation device; permitting the data to pass through the isolation device based on the identity of the computing device, the rate at which the data passes through the isolation device, or the content of the data; and wirelessly transmitting the recorded data to a central facility via a vehicle telematics unit.

According to yet another embodiment of the invention, there is provided an isolation device located at a vehicle that selectively permits the communication of data between a vehicle electronics system and a computing device. The isolation device includes a first data port receiving a wired connection to the vehicle electronics system; a first microprocessor and memory device communicatively linked to the first data port; a second data port receiving a wired connection to the computing device; a second microprocessor and another memory device communicatively linked to the second data port; and a communication bus communicatively linking the first data port and the second data port, wherein data is selectively communicated between the vehicle electronics system and the computing device based on the content of the data, the identity of the computing device, or both.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below uses an isolation device to regulate data communications between vehicle electronics and a separate computing device. The isolation device can be added to an existing vehicle or one nearing manufacture to act as a gate that selectively restricts data transmitted between vehicle electronics and another computing device. Depending on how the isolation device is implemented, it can use a number of control features for regulating the flow of data through the isolation device. For instance, the isolation device can verify the identity of the computing device before permitting data it generates to reach the vehicle electronics. Using a list of authorized device identifiers, the isolation device can determine if the computing device has been granted permission to send data and if so, permit the computing device to send the data; otherwise, the isolation device restricts data transmission. Or in other implementations, the isolation device can detect abnormal data flow between the vehicle electronics and the computing device and in response can shut off the data channel communicating data between them. Additionally, the isolation device can identify the content or type of data it receives and depending on the data type permit or restrict data transmission. The isolation device can also participate in a chain of trust to authenticate the computing device, elements of the vehicle electronics, or both.

The isolation device introduced in a data path in between the vehicle electronics and the computing device(s) can ensure that vehicle electronics operate normally despite an intrusion from an unauthorized user or a compromised computing device attempting to access the data port. Or if an intrusion occurs, the isolation device can minimize disruption of vehicle function. In addition, the isolation device can be quickly added to an existing vehicle soon after a threat has been identified. And the isolation device can be installed in the vehicle in such a way that it is tamper-resistant or difficult to remove or disable.

Communications System—

Figure 1:
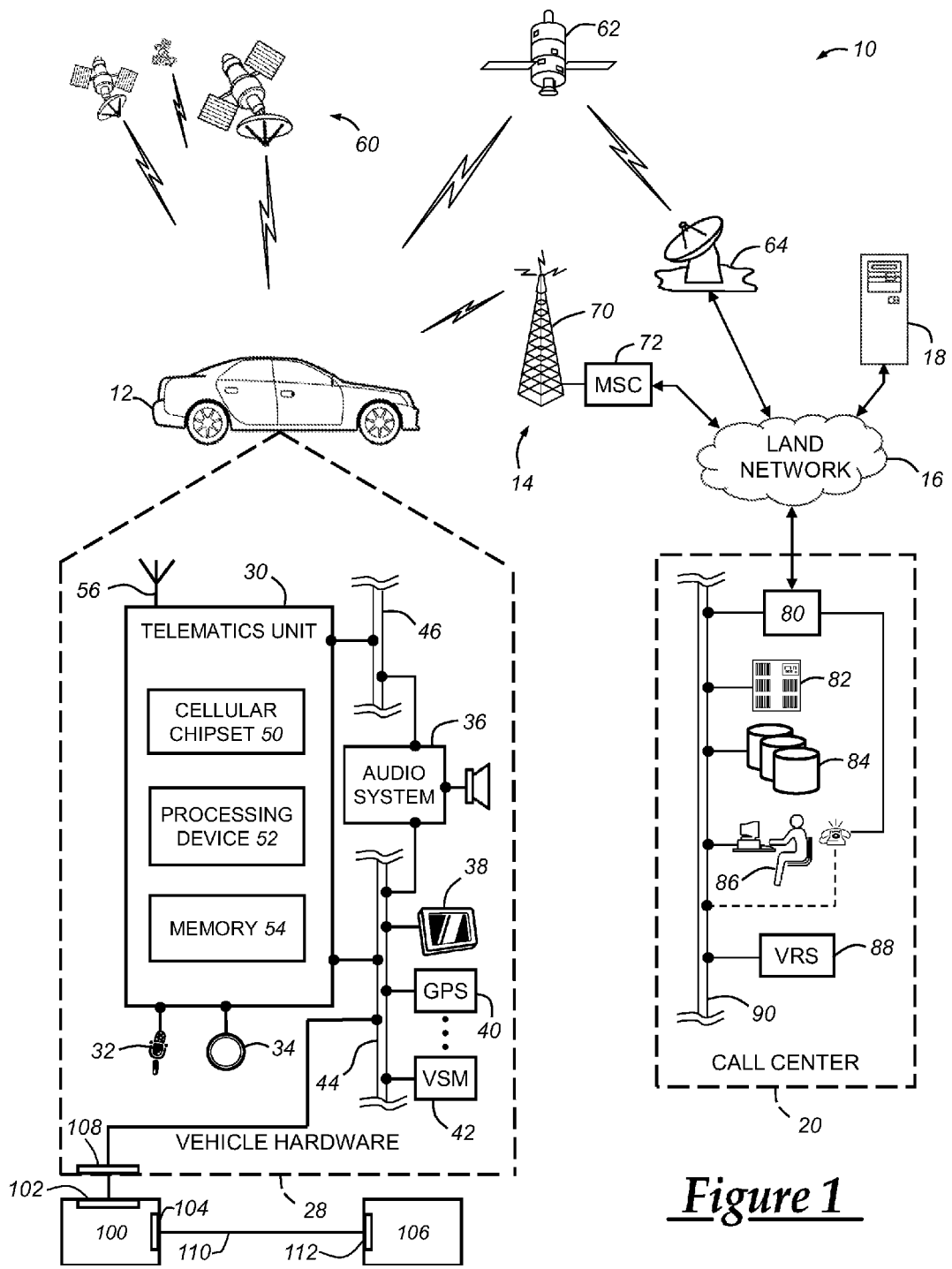
FIG. 1 is a block diagram depicting an embodiment of a communications system that is capable of using the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 (also referred to as a vehicle electronics system) includes a number of vehicle user interfaces that provide vehicle occupants with a means of providing and/or receiving information, including microphone 32, pushbuttons(s) 34, audio system 36, visual display 38, and a vehicle data port 108 that can connect with a isolation device 100. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit 30 to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

The isolation device 100 can include a first data port 102 for communicative connection to the vehicle electronics 28 and a second data port 104 for communicative connection to a computing device 106. The isolation device 100 can receive data at the first data port 102 via the communicative connection, such as a wired data connection, to the vehicle bus 44. The first data port 102 can be connected to the vehicle bus 44 using a vehicle data port 108 that permits the addition or removal of the isolation device 100 to the vehicle bus 44. The vehicle data port 108 can be implemented using any one of a number of data terminals, such as a data link connector (DLC)—also referred to as an on-board diagnostic (OBD) II connector—or other serial data connector, and in some implementations the isolation device 100 can be removably-linked to the vehicle electronics 28 using the vehicle data port 108, the first data port 102, or both. However, other implementations are possible in which the isolation device 100 is permanently installed in the vehicle 12 in a tamper-resistant fashion and the first data port 102 and the vehicle data port 108 serve to provide a permanent hardwire connection between the vehicle electronics 28 and the device 100. Tamper-resistant installation can include, for instance, the use of frangible bolts or heavy-duty mounting materials using hidden fasteners to prevent removal of or tampering with the isolation device. However, tamper-resistant installation can also include establishing a heartbeat verification link between the computing device 106 and an element of the vehicle electronics 28, such as the VSM 42. This will be discussed in more detail below.

The vehicle data port 108 can include a power supply pin 109 as well as a ground pin 111 that are received by the first data port 102. The power supply pin 109 and ground pin 111 electrically connect a vehicle power supply 29 to a power pin 105 and a ground pin 107, respectively, of the second data port 104 using a power cable 113. Electrical power through the power cable 113 can be controlled by a switch 115, such as a field effect transistor (FET), the gate of which is opened and closed at the direction of the first microcontroller 114.

The computing device 106 can be connected to the isolation device 100 at the second data port 104 via a data cable 110 that is physically linked to an device port 112. The computing device 106 generally describes self contained computing hardware that can send data to and receive data from the vehicle electronics 28 and include a device port 112. Examples of computing devices 106 include dongles, electronic control units (ECUs), and third party devices, such as vehicle scan tools or smartphones that may include one of several different types of serial data ports discussed above. The second data port 104 can be implemented using different data port configurations that include a universal serial bus (USB), DLC, Ethernet, or other serial data connector, which can match the device port 112 and collectively communicate data between the computing device 106 and the isolation device 100. However, it should be appreciated that in some implementations the computing device 106 can be a remote access device that wirelessly interacts with the second data port 104 using any one of a variety of wireless communication protocols, such as those defined by IEEE 802.11 or cellular communication protocols.

The isolation device 100 can act as a gateway between the vehicle electronics 28 or vice-versa and the computing device 106. As the computing device 106 transmits data or computer-readable instructions to the vehicle electronics 28, the isolation device 100 can permit or deny passage of the transmitted data. For example, the isolation device 100 can identify the content or type of messages included in the data, the identity of the computing device 106, or both, and then determine whether to allow the data to continue on to the vehicle electronics 28. In one implementation, the isolation device 100 includes a first microprocessor 114 having a memory device 116 that is linked with the first data port 102 and a second microprocessor 118 including a memory device 120 that is linked with the second data port 104. An isolation bus 122 can carry data received at the first data port 102 from the first microprocessor 114 to the second microprocessor 118 and the second data port 104, or vice-versa. When data is received at either the first data port 102 or the second data port 104, the first microprocessor 114 or second microprocessor 116, respectively, can identify information included in the data and depending on that information, allow the data to be sent over the isolation bus 122. This will be discussed in more detail below.

Returning to FIG. 1, wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.
Method—

Figure 2:
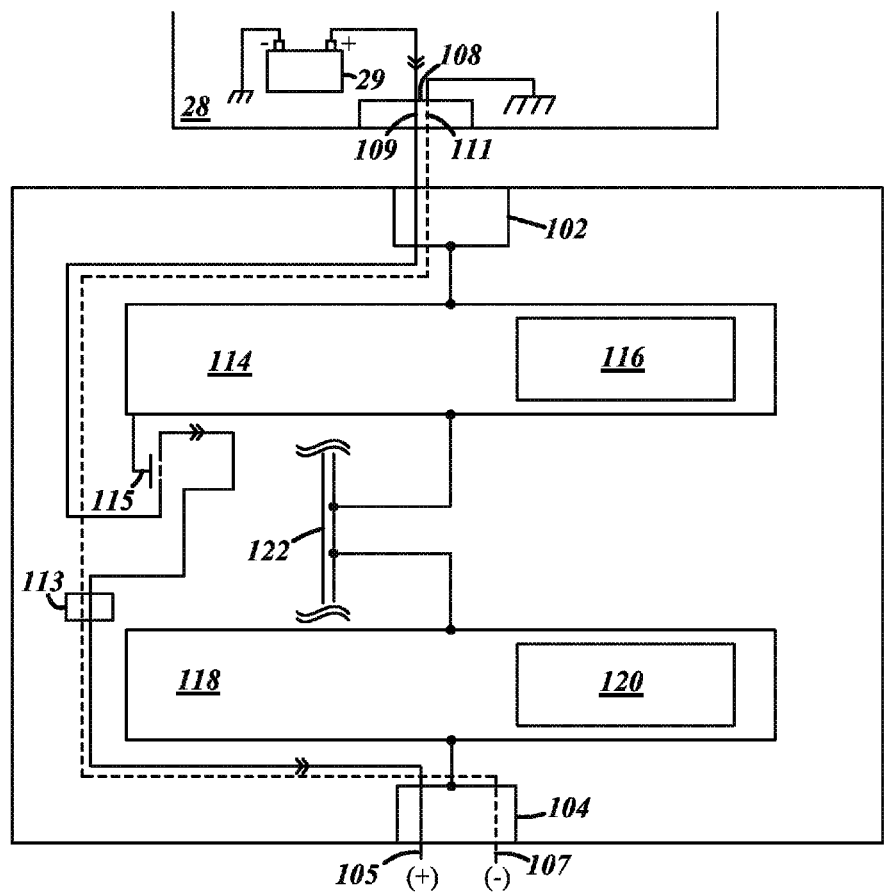
FIG. 2 is an implementation of an isolation device that is capable of using the method disclosed herein.
Figure 3:
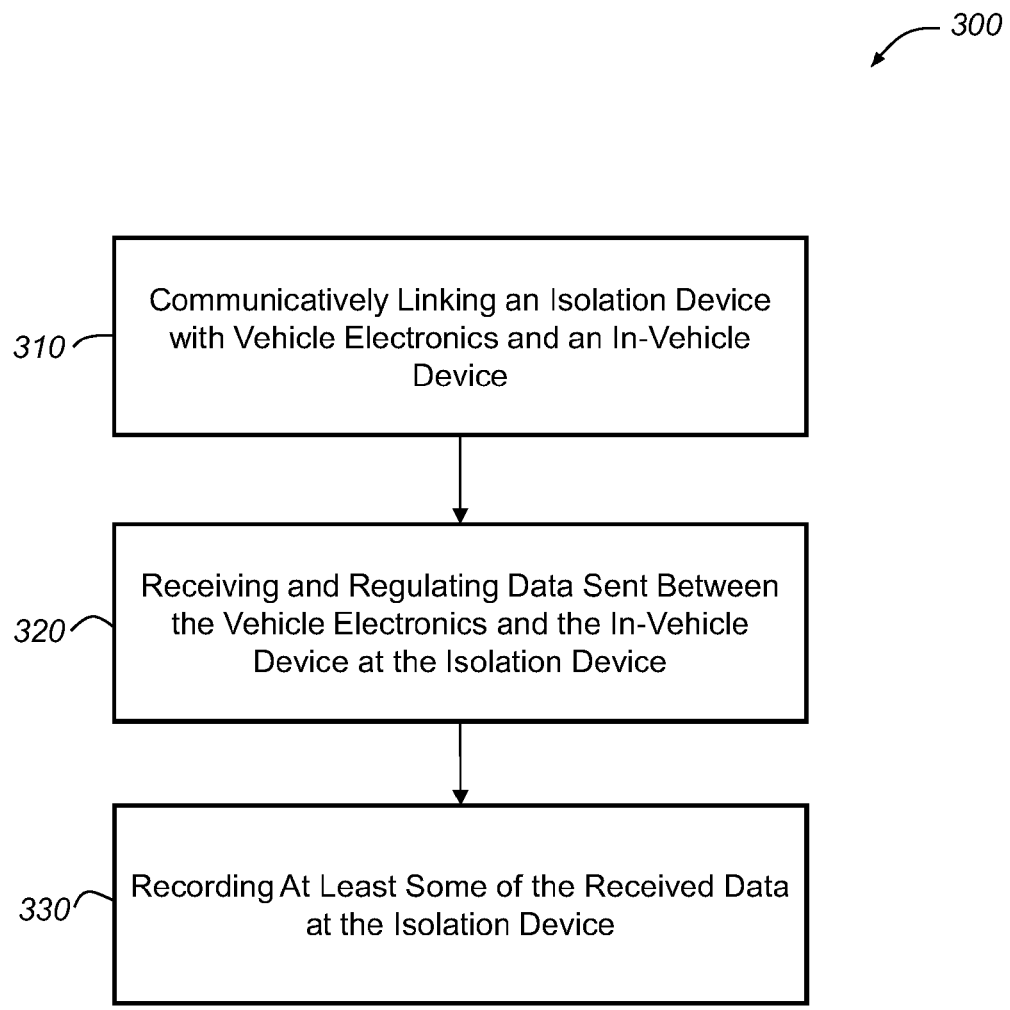
FIG. 3 is an implementation of a method of isolating data communications between a vehicle electronics system and a computing device.

Referring now to FIGS. 2 and 3, there is shown a method 300 of isolating data communications between the vehicle electronics 28 and the computing device 106 using the isolation device 100. The method 300 begins at step 310 by communicatively linking the first data port 102 of the isolation device 100 with the vehicle electronics 28 and the second data port 104 of the isolation device 100 with the computing device 106 as is described above. During or after vehicle production, the isolation device 100 can be added to the vehicle 12 to regulate data communication between elements of the vehicle electronics 28 and the computing device 106. As noted above, some implementations can be designed so that removal of the isolation device 100 from the vehicle 12 is difficult or tamper-resistant. Use of the isolation device 100 can be particularly effective for existing vehicles as the isolation device 100 can include updated security policies for data communication within the vehicle 12 that can be added to existing vehicle electronics 28 without significant modification to the electronics elements. The method 300 proceeds to step 320.

At step 320, data sent between the computing device 106 and the vehicle electronics 28 is received at the isolation device 100. For example, a number of different data messages can be sent to the vehicle electronics 28 and received at the isolation device 100 beforehand. The content or type of the data or data messages received at the isolation device 100 can be determined based on a message identifier. The message identifier can provide the identity of the computing device 106, the type or content of the data message, or both.

The computing device 106 can be identified using device identifiers stored in the isolation device 100 that can be compared to the received message identifier. In one example, a device identifier for the computing device 106 can be stored at the isolation device 100. When the computing device 106 transmits data messages that are received by the isolation device 100, the device identifier of the device 106 can be included in the message identifier along with the data. The isolation device 100 can compare the received device identifier with a database containing device identifiers previously-stored at the isolation device 100. When the isolation device 100 identifies a match, the data can be permitted to pass; otherwise, the data can be blocked and/or deleted. As part of configuring the isolation device 100, a central facility or vehicle manufacturer can supply an authenticated list of computing devices to the isolation device 100.

The authenticated list can be loaded in the isolation device 100 when the device 100 is installed in the vehicle 12 or it can be wirelessly transmitted to the device 100 from a central facility, such as the computer 18 or call center 20. The vehicle telematics unit 30 can receive the list and communicate it to the isolation device 100 via the vehicle bus 44. By wirelessly transmitting the authenticated list, it is possible to periodically update the list in the isolation device 100 by adding or deleting authorized computing devices include in the authenticated list.

The content of the data message can be indicated by the message identifier along with or instead of a device identifier. For example, the message identifier can indicate that the data or data message is a diagnostic trouble code (DTC), an instruction to control the vehicle's braking system, audio system, or telematics unit 30. It should be appreciated that this list of data types is not exhaustive and others are possible. The central facility or vehicle manufacturer can create a list of data type permissions that regulates the data passing through the isolation device 100 to the vehicle electronics 28. The data type permissions can include not only the type of data but it can also regulate other variables of data transmission, such as the frequency with which certain data types are sent. When the isolation device 100 reads the message identifier, the device 100 can determine what type of message the data represents. Using the list of data type permissions, the data may be permitted to pass or blocked. For instance, the vehicle manufacturer may create a list that allows DTC requests or information to be exchanged between the computing device 106 and the vehicle electronics 28. The isolation device 100 can read the message identifier, determine that data from the computing device 106 includes DTC data, compare the message identifier with the list of data type permissions, and then permit the data to pass based on the comparison. However, the vehicle manufacturer may not allow the computing device 106 to send vehicle braking related messages to the vehicle electronics 28. When the isolation device 100 compares information included in the message identifier with the list of data type permissions and determines that the data is braking related, the device 100 can stop the data from reaching the vehicle electronics 28.

In one implementation, the data from the computing device 106 can pass through the first and second microprocessors 114, 118 of the isolation device 100. The data can be initially received by the second microprocessor 118, which can access the authenticated list, the list of data type permissions, or both stored in the memory device 120. Once the data has been authenticated by comparing the message identifier to one or more lists, the data can be sent over the isolation bus 122 to the first microprocessor 114 that transmits the data to the vehicle electronics 28 through the first data port 102. It should be appreciated that the isolation device 100 can also, or alternatively, receive data from the vehicle electronics 28 via data port 102 and identify the message identifier(s) of data received from the vehicle electronics 28 as destined for the computing device 106.

And apart from the message identifier and lists, the isolation device 100 can identify unauthorized access and prevent tampering in other ways. For instance, an unusually high rate of data flow can indicate unauthorized access. The isolation device 100 can short the isolation bus 122 or turn off power to the isolation device 100 based on a data rate that exceeds a threshold or a data rate for a particular type of message. In one example of how power can be regulated at the isolation device 100, the first microprocessor 114 can turn off power to the computing device 106 by opening the switch 115 that controls electrical power from the vehicle power supply 29. Or the computing device 106 can be instructed to stop all data transfers travelling through the second data port 104 based on one or more vehicle conditions using the first microprocessor 114, the second microprocessor 118, or both.

Further, the vehicle 12 can validate the presence of the isolation device 100 with another element of the vehicle electronics 28 using a heartbeat response mechanism. For instance, the VSM 42 and the isolation device 100 can exchange a periodic signal verifying the existence and identity of the device 100 to the VSM 42. In one implementation, the VSM 42 and the isolation device 100 can each use a private key and symmetric encryption to periodically exchange a communication message. The message can be protected by a message authentication code (MAC) appended to the message that is encrypted/decrypted using the private keys. The receipt of the message along with a valid MAC can inform the vehicle 12 that a valid isolation device 100 is operational. The method 300 proceeds to step 330.

At step 330, at least some portion of the received data is recorded at the isolation device. To monitor the data passing between the computing device 106 and the vehicle electronics 28, the first and/or second memory device 116, 120, can be used to record or log the identity of the computing device 106 sending data, the type(s) of data sent by the computing device 106, or both. The record can be created over a defined period of time and then accessed from the isolation device 100 by an authorized user or wirelessly transmitted to a central facility via the vehicle telematics unit 30. The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of regulating data communications between a vehicle electronics system and a computing device, comprising the steps of:
   (a) communicatively linking a first data port of an isolation device with the vehicle electronics system;
   (b) communicatively linking a second data port of the isolation device with the computing device, wherein the isolation device includes first and second microprocessors with the first microprocessor being linked to the first data port and the second microprocessor being linked to the second data port, and wherein the first and second microprocessors are communicatively linked to each other via a communications bus that separates the first and second microprocessors from each other;
   (c) receiving data at the isolation device sent between the computing device and the vehicle electronics system;
   (d) determining whether the computing device is authorized to send data by comparing the content of a message identifier included with the received data with one or more authorized device identifiers, or a list of data type permissions, or both;
   (e) upon determining that the computer device is authorized to send data, permitting the data to pass through the isolation device between the first and second microprocessors via the communication bus based on the identity of the computing device, the rate at which the data passes through the isolation device, or the content of the data; and
   (f) in response to a detection of tampering or unauthorized access, preventing communication between the first or second microprocessors via the communication bus by deactivating the communication bus, the tampering or unauthorized access determined based on at least one of the identity of the computing device, the rate at which the data passes through the isolation device, or the content of the data.

2. The method of claim 1, further comprising the step of detecting the message identifier included in the received data.

3. The method of claim 2, further comprising the step of comparing the content of the message identifier with one or more device identifiers.

4. The method of claim 2, further comprising the step of comparing the content of the message identifier with a list of data type permissions.

5. The method of claim 1, further comprising the step of wirelessly receiving an update of a list of data type permissions, a device identifier, or both.

6. The method of claim 1, further comprising the step of installing the isolation device in the vehicle with tamper-resistance attachments.

7. The method of claim 1, wherein the step of deactivating the communication bus includes depowering the communication bus or shorting the communication bus.

8. A method of regulating data communications between a vehicle electronics system and a computing device, comprising the steps of:
   (a) communicatively linking a first data port of an isolation device with the vehicle electronics system;
   (b) communicatively linking a second data port of the isolation device with a computing device, wherein the isolation device includes first and second microprocessors with the first microprocessor being linked to the first data port and the second microprocessor being linked to the second data port, and wherein the first and second microprocessors are communicatively linked to each other via a communications bus that separates the first and second microprocessors from each other;
   (c) receiving data at the isolation device sent between the computing device and the vehicle electronics system;
   (d) determining whether the computing device is authorized to send data by comparing the content of a message identifier included with the received data with one or more authorized device identifiers, or a list of data type permissions, or both;
   (e) recording at least some portion of the received data at the isolation device;
   (f) upon determining that the computer device is authorized to send data, permitting the data to pass through the isolation device between the first and second microprocessors via the communication bus based on the identity of the computing device, the rate at which the data passes through the isolation device, or the content of the data;
   (g) wirelessly transmitting the recorded data to a central facility via a vehicle telematics unit; and
   (h) in response to a detection of tampering or unauthorized access, preventing communication between the first or second microprocessors via the communication bus by deactivating the communication bus, the tampering or unauthorized access determined based on at least one of the identity of the computing device, the rate at which the data passes through the isolation device, or the content of the data.

9. The method of claim 8, further comprising the step of detecting the message identifier included in the received data.

10. The method of claim 9, further comprising the step of comparing the content of the message identifier with one or more device identifiers.

11. The method of claim 9, further comprising the step of comparing the content of the message identifier with a list of data type permissions.

12. The method of claim 8, further comprising the step of wirelessly receiving an update of a list of data type permissions, a device identifier, or both.

13. The method of claim 8, further comprising the step of installing the isolation device in the vehicle with tamper-resistance attachments.

14. An isolation device located at a vehicle that selectively permits the communication of data between a vehicle electronics system and a computing device, comprising:
 a first data port receiving a wired connection to the vehicle electronics system;
 a first microprocessor and memory device communicatively linked to the first data port;
 a second data port receiving a wired connection to the computing device;
 a second microprocessor and another memory device communicatively linked to the second data port; and
 a communication bus communicatively linking the first data port and the second data port and separating the first and second microprocessors from each other, wherein data is selectively communicated between the vehicle electronics system and the computing device via the communication bus along a data path including both the first and second microprocessors based on the content of the data, the identity of the computing device, or both;
 wherein the isolation device is configured to determine whether the computing device is authorized to send data by comparing the content of a message identifier included with the received data with one or more authorized device identifiers, or a list of data type permissions, or both; and
 wherein the isolation device is configured to, in response to a detection of tampering or unauthorized access, prevent communication between the first or second microprocessors via the communication bus by deactivating the communication bus, the tampering or unauthorized access determined based on at least one of the identity of the computing device, the rate at which the data passes through the isolation device, or the content of the data.

15. The isolation device of claim 14, wherein the isolation device is communicatively linked to a vehicle telematics unit.

16. The isolation device of claim 15, wherein the vehicle telematics unit wirelessly receives an update of a list of data type permissions, a device identifier, or both.

17. The isolation device of claim 14, wherein the isolation device is installed in the vehicle with tamper-resistance attachments.

18. The isolation device of claim 14, wherein one or more device identifiers are stored in the memory device of the first microprocessor or the memory device of the second microprocessor.

19. The isolation device of claim 14, wherein a list of data type permissions is stored in the memory device of the first microprocessor or the memory device of the second microprocessor.

* * * * *